United States Patent [19]

McCaulay et al.

[11] 4,246,094

[45] Jan. 20, 1981

[54] PROCESS FOR UPGRADING NAPHTHA HYDROCARBONS

[75] Inventors: David A. McCaulay, Homewood; Thomas D. Nevitt, Naperville, both of Ill.

[73] Assignee: Standard Oil Company (Indiana), Chicago, Ill.

[21] Appl. No.: 47,059

[22] Filed: Jun. 11, 1979

[51] Int. Cl.³ .............................................. C10G 59/00
[52] U.S. Cl. ........................................ 208/57; 208/64; 208/91; 208/93
[58] Field of Search ................... 208/92, 93, 79, 80, 208/57, 91

[56] References Cited

U.S. PATENT DOCUMENTS

| | | | |
|---|---|---|---|
| 2,324,295 | 7/1949 | Goldsby et al. | 208/93 |
| 2,918,422 | 12/1959 | Evering et al. | 208/79 |
| 3,761,392 | 9/1973 | Pollock | 208/93 |
| 3,776,837 | 12/1973 | Dautzenberg et al. | 208/65 |
| 3,948,761 | 4/1976 | Siskin et al. | 585/743 |

Primary Examiner—Herbert Levine
Attorney, Agent, or Firm—William T. McClain; William H. Magidson; James R. Henes

[57] ABSTRACT

A process which comprises fractionating a wide-boiling range naphtha feedstock into a low-boiling, light-naphtha fraction having an end or maximum boiling point within the range of about 190° to about 200° F. (88° to about 104° C.), and a high-boiling, heavy-naphtha fraction having an initial boiling point within a range of about 190° to about 220° F. (88° to about 104° C.), and contacting the light-naphtha fraction in an isomerization zone with added hydrogen and a catalyst comprising tantalum pentafluoride and hydrogen halide to produce effluent yielding naphthene components which are blended with the heavy-naphtha fraction. The resulting blended material can be processed by reforming to produce an aromatic-rich naphtha product and hydrogen.

9 Claims, 1 Drawing Figure

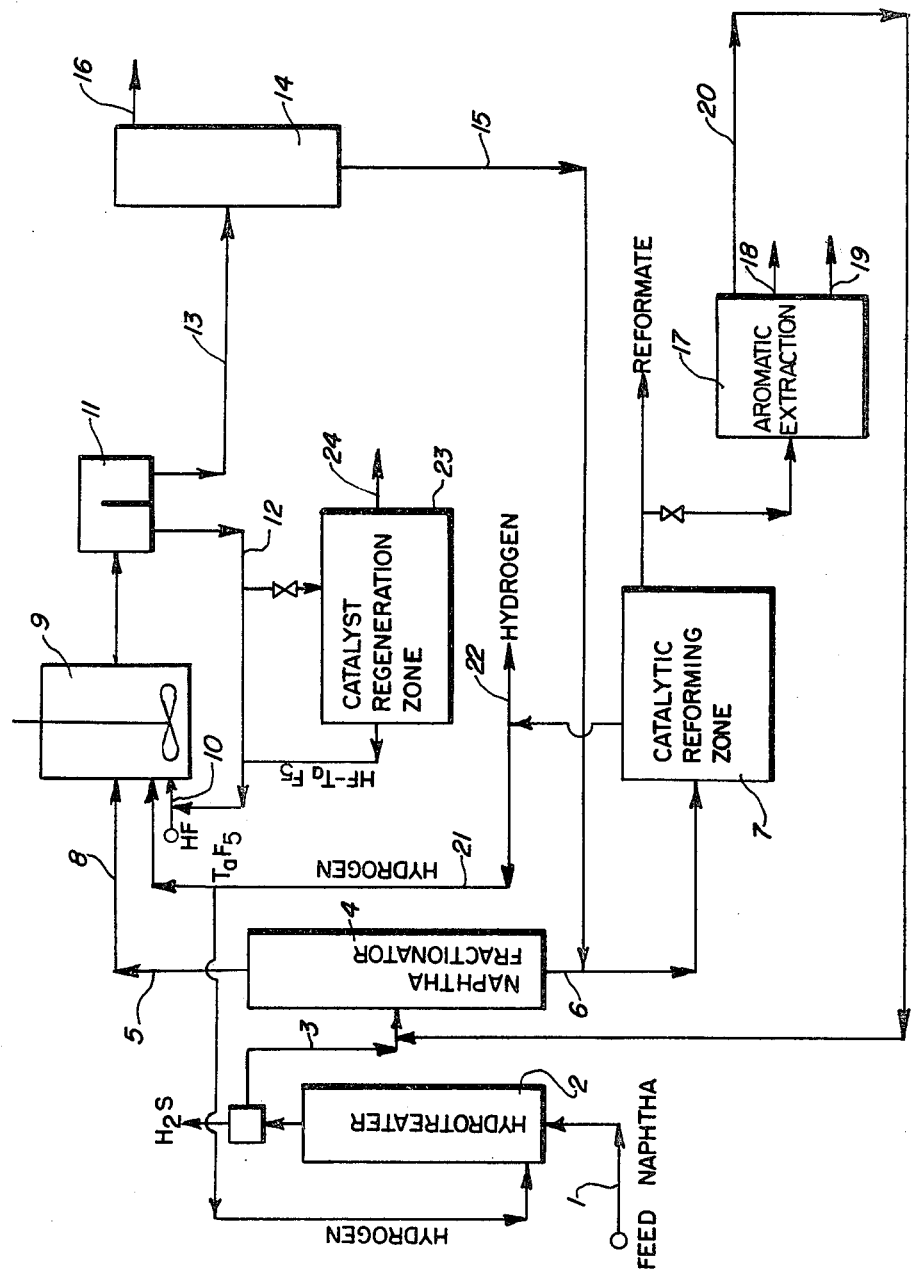

PROCESS FOR UPGRADING NAPHTHA HYDROCARBONS

This invention relates to a process for increasing the octane rating of hydrocarbons in the naphtha boiling range. More particularly, this invention relates to isomerization and reforming of naphtha hydrocarbons to produce an aromatic-rich product.

In the petroleum refining industry the demand for high octane gasoline has increased development of isomerization, alkylation, and other upgrading treatments for hydrocarbon feedstocks. The use of metal pentafluorides such as tantalum, niobium, and antimony pentafluorides in halogen acid solvents for acid catalyzed reactions has been described. For example, U.S. Pat. No. 2,683,764 (Lien et al, 1954) discloses that HF-TaF$_5$ is a powerful catalyst for isomerization, alkylation, cracking and other reactions and U.S. Pat. No. 3,948,761 (Siskin et al, 1976) discloses that HF-TaF$_5$ is a preferred catalyst system for the isomerization of acyclic and alicyclic aliphatic hydrocarbons.

Hydrogen is typically employed in paraffin isomerization in order to inhibit cracking and the advantage of tantalum pentafluoride catalyst over pentafluorides of antimony or niobium is that tantalum is not reduced in hydrogen, whereas antimony and at slower rate, niobium are reduced from the active +5 to the inactive +3 valence state.

U.S. Pat. No. 3,852,184 (Siskin et al, 1974), which is incorporated herein by reference, discloses a process for upgrading reformer feedstock containing alkylcyclopentanes by isomerizing said feedstock components in the presence of hydrogen and a catalyst mixture comprising a metal halide, such as tantalum and/or niobium pentafluoride, and a protonic acid, such as hydrogen fluoride, so that the alkylcyclopentanes are converted to the corresponding cyclohexane isomers. The patentees indicate "In general, the feed to be treated in accordance with the invention will include typical reformer feeds such as the normally liquid feedstocks boiling substantially within the range of from about 150° to 430° F., more particularly 180° to 350° F., such as a virgin naphtha, a coker naphtha, and the like." (Column 2, lines 56–63). This process has the drawback of the loss of high octane aromatic components, particularly toluene and heavier aromatics, from the typical naphtha reformer feed when subjected to the isomerization treatment. As shown in Example 3 of the patent, the aromatic components were reduced by about 50% in the isomerized product. Furthermore, such aromatics are known to cause poisoning of the TaF$_5$ catalyst as pointed out in U.S. Pat. No. 4,065,405 (Hulme, 1977). An additional disadvantage of this process is the depression in the production of desirable isomerization products such as isopentane, neohexane, cyclohexane and methylcyclohexane caused by detrimental interference of heavy unbranched paraffins such as the straight chain paraffins having about eight or more carbon atoms which are present in the typical naphtha reformer feedstock.

In contrast, the process of this invention comprises isomerization of only the light-naphtha fraction boiling below about 220° F. (104° C.) from normally wide-boiling range naphtha reformer feedstock which has been fractionated, and recombining the isomerized light-naphtha fraction with the higher-boiling naphtha fraction to provide reconstituted, superior reforming feedstock. The process of this invention thus avoids isomerization interference by the heavy straight chain paraffins as well as avoiding the poisoning effect upon the tantalum pentafluoride isomerization catalyst of toluene and other aromatic components in the higher-boiling heavy-naphtha fraction and preserves such high octane components because the heavy naphtha fraction is not subjected to the isomerization treatment.

The general object of this invention is to improve the octane of gasoline blending stock through isomerization of a portion of naphtha reforming feed. Another object of this invention is to increase the yield of aromatics in the naphtha reformate.

We have found the objects of this invention can be achieved in a process which comprises separating a wide-boiling range naphtha feedstock into a low-boiling, light-naphtha fraction having an end or maximum boiling point within the range of about 190° to about 220° F. (88° to about 104° C.), and a high-boiling, heavy-naphtha fraction having an initial boiling point within a range of about 190° to about 220° F. (88° to about 104° C.), and contacting the light-naphtha fraction in an isomerization zone with added hydrogen and a catalyst comprising tantalum pentafluoride and hydrogen halide to produce effluent yielding naphthene components which are blended with the heavy-naphtha fraction. The resulting blended material can be processed by reforming to produce an aromatic-rich naphtha product and hydrogen.

Isomerization of only the light-naphtha fraction results in conversion of methylcyclopentanes and dimethylcyclopentanes to the corresponding higher-boiling and equilibrium-favored cyclohexane and methylcyclohexane as well as isomerization of normal C$_5$–C$_7$ paraffins to branched paraffins having higher octane. As a result, isomerization of the light-naphtha fraction produces substantial gain in the octane rating of the effluent while avoiding subjection of the isomerization catalyst, TaF$_5$, to the poisonous aromatic components of the heavy-naphtha fraction. In addition, heavy straight-chain paraffins remain in the heavy-naphtha fraction and do not interfere with the isomerization reactions.

BRIEF DESCRIPTION OF THE DRAWING

The Drawing is a process flow diagram depicting a commercial operation embodying the process of this invention.

Broadly, in the process of this invention a wide-boiling range naphtha, comprising predominantly C$_5$ to C$_{10}$ hydrocarbons and typically boiling in a broad range of about 80° to about 450° F. (27° to about 232° C.), more preferably 90° to about 360° F. (32° to about 182° C.), is fractionated into at least one light fraction and at least one heavy fraction with at least one separation at about 190°–220° F. (88°–104° C.), more suitably about 200°–215° F. (93°–101° C.). A light-naphtha boiling in the range of about 90° to about 220° F. (32° to about 104° C.) contains components ranging from normal pentane with some normal heptane, which has a boiling point of about 209° F., but does not include appreciable toluene, which has a boiling point of 231° F., nor octanes and heavier hydrocarbons particularly the heavy straight-chain paraffins having eight or more carbon atoms which impair isomerization of the light-naphtha with TaF$_5$ catalyst. Consequently, substantially all the toluene and the heavy unbranched paraffins with eight or more carbon atoms such as normal octane and normal nonane are contained in the heavy-naphtha fraction. Significantly, trimethylcyclopentanes are contained in the heavy-naphtha fraction and can be readily converted to aromatics in the reformer without necessity of the isomerization to cyclohexanes by treatment with $TaF_5$ catalyst, unlike the mono- and dimethylcyclopentanes contained in the light-naphtha fraction, which benefit from isomerization to cyclohexanes prior to dehydrogenation to produce aromatics. Preferably, the separation is made at about 205°–210° F. (96°–99° C.) to produce a light-naphtha fraction comprising mainly pentanes, hexanes, heptanes, methylcyclopentane, cyclohexane, dimethylcyclopentanes, and benzene. A preferred light-naphtha comprises $nC_5-nC_7$, boiling in the range of about 90°–210° F. (32°–99° C.).

The light-naphtha isomerization feed can be treated to saturate or remove benzene in order to prevent benzene from deactivating the $TaF_5$ isomerization catalyst. Hydrotreatment of the light-naphtha under somewhat more severe conditions than conventional naphtha hydrofiningdesulfurization can be employed in order to hydrogenate benzene. Such hydrotreatment can be employed with conventional hydrogenation catalyst, typically containing hydrogenation metal such as platinum, palladium, or nickel, under process conditions in the range of about 650°–800° F. (46°–54° C.) and hydrogen partial pressure in the range of about 500–1,000 psi (35–70 kg/cm$^2$) at about 2–5 weight hourly space velocity. Alternatively, the light-naphtha isomerization feed can be treated to selectively adsorb benzene, for example by contact with molecular sieve such as Linde 13X, manufactured by Union Carbide Corporation.

Isomerization of the light-naphtha fraction is carried out under hydrogen pressure to control cracking of the hydrocarbons, using a catalyst system comprising tantalum pentafluoride ($TaF_5$) in a protic acid solvent or diluent such as $HSO_3F$, perfluoroalkyl sulfonic acids, or hydrogen halide, preferably hydrogen fluoride which is the preferred solvent because of its ease in separation from the isomerization products. Tantalum pentafluoride is meant to include tantalum pentafluoride as well as other fluoride species, e.g., ions such as $Ta_2F_{11}^-$ $Ta_3F_{16}^-$ and the like, that may be formed when tantalum pentafluoride is mixed with the hydrogen halide and the hydrocarbon reactants. Tantalum pentafluoride is also meant to include tantalum pentafluoride formed "in situ" as well as other species produced by the reaction of tantalum pentachloride or similar precursors with hydrogen fluoride. The diluent: $TaF_5$ weight ratio can range from about 50:1 to about 1:1 and preferably from about 6:1 to about 2:1 in order to maintain practical rate of reaction.

In a preferred operation of the isomerization treatment, $C_8-C_{14}$ multiply-branched paraffin is charged with the light naphtha fraction for promotion of the desired isomerization products such as neohexane, as more fully disclosed in our copending U.S. patent application Ser. No. 47,060 filed on even date herewith in the names David A. McCaulay and Thomas D. Nevitt, titled *ISOMERIZATION PROCESS*, which is incorporated herein by reference.

Reaction in the isomerization zone can be conducted as a batch or more preferably a continuous type of operation. In a preferred embodiment, hydrocarbon and catalyst are contacted and maintained substantially in the liquid forms with the reaction conducted in one or more reactors in concurrent, cross-current or counter-current flow typically employing conventional continuous stirred-tank reaction. In the isomerization reaction the presence of hydrogen minimizes heptane cracking and the formation of unsaturates which lead to polyunsaturated "red-oil" complex with $TaF_5$ deactivating the catalyst. However, high hydrogen pressures also slow down the overall rate of reaction so that the pressure must be adjusted to maintain balance between reaction rate and catalyst life. Suitably, hydrogen pressure of about 25 to about 1,000 psi (1.75–70 kg/cm$^2$) can be employed with a temperature in the range of 0°–150° F. (−18° to 66° C.). Preferably, hydrogen pressure in the isomerization zone can be about 100–800 psi (7–56 kg/cm$^2$) with temperature in the range of 70°–125° F. (21°–52° C.) and more preferably hydrogen pressure in the range of about 200–500 psi (14–35 kg/cm$^2$) is employed with a temperature in the range of about 70°–90° F. (21°–32° C.) to allow operation near the temperature of refinery cooling water.

Suitable space velocity in the isomerization zone can be within the range of about 0.5 to about 10 weight units of light-naphtha feed per hour per weight unit of $TaF_5$; generally, lower temperature requires correspondingly lower space velocity and at ambient temperature in the range of about 70°–125° F. (21°–52° C.), space velocity should be between about 0.5 to about 5.0 WHSV, preferably about 0.5 to about 2.5 WHSV.

Gradual deactivation of the $TaF_5$ catalyst caused by complex of the catalyst with polyunsaturated "red-oil" isomerization by-product will generally make necessary regeneration of the spent catalyst, preferably in a continuous catalyst regeneration zone. The spent catalyst can be regenerated by known methods such as treatment of the by-product complex with hydrogen at elevated temperatures and pressures as disclosed in U.S. Pat. No. 4,120,912 (Hulme, 1978) or by displacement of $TaF_5$ from the complex with a Lewis acid such as $AlBr_3$ as disclosed in U.S. Pat. No. 4,065,405 (Hulme, 1977), and both patents are incorporated herein by reference. Another method of regenerating the catalyst is hydrolysis of the by-product complex with sufficient water to separate the red-oil and subsequent dehydration of the hydrolyzed catalyst with molecular chlorine as disclosed in U.S. Pat. No. 4,069,268 (Siskin et al., 1976).

Isomerization of the light-naphtha produces conversion of methylcyclopentanes and dimethylcyclopentanes to the corresponding higher-boiling and equilibrium-favored cyclohexane and methylcyclohexane as well as isomerization of normal $C_5-C_7$ paraffins to branched paraffins having higher octane. As a result, isomerization of the light-naphtha produces substantial gain in the octane rating of the effluent while avoiding subjection of the isomerization catalyst, $TaF_5$, to the poisonous aromatic components of the heavy-naphtha fraction. In addition, heavy straight-chain paraffins remain in the heavy-naphtha fraction and do not interfere in the isomerization reactions. The effluent from the isomerization zone can be separated, suitably by distillation into an overhead fraction consisting mainly of $C_5-C_6$ branched paraffins and a heavier naphthene-rich fraction comprising cyclohexane and methylcyclohexane naphthenes which can be dehydrogenated to aromatics, benzene and toluene, by blending this naphthene fraction with the original heavy-naphtha fraction and processing the resulting blend by conventional catalytic reforming.

Any suitable naphtha reforming process can be employed with the process of this invention such as typical commercial catalytic reforming processes, generally employing platinum-group metal catalysts, described in *Hydrocarbon Processing,* Vol. 57, No. 9, September, 1978, pp. 159–166, which is incorporated herein by reference. While a number of reactions take place during reforming, a primary reaction is the dehydrogenation of naphthenes to form aromatics and produce hydrogen.

A preferred operation of the process of this invention is depicted in the Drawing. A typical straight-run naphtha feed, comprising predominantly $C_5$ to $C_{10}$ hydrocarbons is passed with hydrogen through line 1 into hydrodesulfurization pretreating reactor 2 where sulfur content is reduced to about 10 ppm or less. Desulfurization effluent is then taken to line 3 into fractionation tower 4 where it is separated into a light and a heavy fraction separated at about 200°–210° F. (93°–99° C.). The heavy-naphtha fraction is sent through line 6 to reforming zone 7. The light-naphtha isomerization feed is taken overhead through line 5 and is preferably dearomatized (not shown), primarily to remove benzene, for example by passing the light naphtha over a fixed bed of 13X molecular sieve or by hydrogenation over a platinum or palladium catalyst. The dearomatized light-naphtha, preferably blended with $C_8$ or higher carbon number highly branched paraffin, is passed through line 8 into isomerization reactor 9 where it is contacted with HF-$TaF_5$ catalyst at about ambient temperature and under hydrogen pressure. Make-up catalyst enters through line 10 in the ratio of about 0.1 to about 2.0 weight of $TaF_5$ per weight of HF. The isomerization reactor effluent is passed into settler 11 where the heavier catalyst phase separates as a bottom layer and is recycled to the reactor through line 12. As the catalyst ages, it gradually loses some of its activity due to the formation of the polyunsaturated "red-oil" complex, and therefore part of the recycled catalyst can be sent to catalyst regeneration zone 23 with removal of a small slip stream through line 24 with replacement by fresh catalyst through line 10. The upper hydrocarbon phase from the settler, after separating any entrained or dissolved catalyst, is sent through line 13 into product fractionator 14, where an overhead fraction comprising $C_5$–$C_6$ branched paraffins can be separated from a bottoms fraction comprising mainly cyclohexane and methylcyclohexane. The $C_5$–$C_6$ paraffin fraction is suitable for gasoline blending and can be removed through line 16; the fraction comprising naphthenes is withdrawn through line 15 and blended with the original heavy-naphtha fraction sent to reforming zone 7. Reforming zone 7 consists of one or more conventional units, typically employing platinum-rhenium catalyst. Some of the reformate can be treated in aromatic extraction zone 17 to produce a benzene-toluene-xylene product removed through line 18 and a heavy aromatics product removed through line 19. The raffinate, containing most of the saturates, is recycled through line 20 to naphtha fractionator 4. Part of the hydrogen produced in the reforming zone is recycled through line 21 to the desulfurization and isomerization zones and the remainder is removed as product through line 22.

The following examples are illustrative of this invention but do not indicate limitation upon the scope of the claims.

EXAMPLE 1

A straight-run, wide-boiling range naphtha, boiling in the range of from about 140° to about 350° F. (60° to about 175° C.) and containing about 248 ppm sulfur was analyzed and found to contain the following hydrocarbons:

| COMPONENT | | WT. % |
|---|---|---|
| C6 | AROMATIC | 1.65 |
| C7 | AROMATIC | 3.22 |
| C8 | AROMATIC | 4.77 |
| C9 | AROMATIC | 0.736 |
| C6 | NAPHTHENE | 6.09 |
| C6 | PARAFFIN | 13.9 |
| C7 | NAPHTHENE | 11.6 |
| C7 | PARAFFIN | 18.5 |
| C8 | NAPHTHENE | 9.87 |
| C8 | PARAFFIN (Substantially normal and single branch) | 16.5 |
| C9 | NAPHTHENE | 4.31 |
| C9 | PARAFFIN (Substantially normal and single branch | 7.77 |
| C10 | NAPHTHENE | 0.297 |
| C10 | PARAFFIN (Substantially normal and single branch) | 0.698 |

This wide-boiling range naphtha was fractionated in a bench-scale distillation column at a reflux ratio of about 4:1 to produce a light-naphtha overhead product in an amount of approximately 25 wt.% of the feed. The light-naphtha distillate fraction boiling in the range of about 90° to about 210° F. (32° to about 99° C.), and containing 195 ppm sulfur was analyzed to contain the following components:

| Component | WT. % |
|---|---|
| pentanes | 0.07 |
| 2,3-dimethylbutane | 0.27 |
| 2-methylpentane | 4.24 |
| 3-methylpentane | 6.52 |
| n-hexane | 31.26 |
| methylcyclopentane | 10.07 |
| dimethylpentanes | 5.61 |
| benzene | 5.21 |
| cyclohexane | 8.63 |
| 2-methylhexane | 7.70 |
| 3-methylhexane | 8.34 |
| dimethylcyclopentane | 8.65 |
| n-heptane | 2.58 |
| methylcyclohexane | 0.98 |

The bottom fraction, heavy-naphtha contained the balance of the feed components.

The light-naphtha distillate fraction was catalytically hydrotreated to remove sulfur and to dearomatize benzene and any traces of other aromatics in a fixed bed of approximately 30 cc of a 14–20 mesh (U.S. Sieve Series) commercial catalyst with the nominal composition 6 wt.% nickel oxide, 19 wt.% tungsten oxide, and 75 wt.% alumina oxide. The lined out hydrotreating reaction conditions include a temperature of about 660° F. (349° C.), 850 psig (59.5 kg/cm$^2$) reactor pressure, hydrogen flow rate of about 2,000 SCF/bbl and a space velocity of about 0.67 weight units of hydrocarbon per hour per weight unit of catalyst. The hydrotreated light-naphtha was analyzed to contain the following components:

TABLE I

| Components in 210° F. end-boiling-point desulfurized, dearomatized light-naphtha | |
|---|---|
| Component | Wt. % |
| cyclopentane | 0.1 |

TABLE I-continued

Components in 210° F. end-boiling-point desulfurized, dearomatized light-naphtha

| Component | Wt. % |
|---|---|
| 2,3-dimethylbutane | 0.6 |
| 2-methylpentane | 3.5 |
| 3-methylpentane | 5.6 |
| n-hexane | 29.6 |
| methylcyclopentane | 9.3 |
| dimethylpentanes | 6.1 |
| trimethylbutane | 0.1 |
| cyclohexane | 14.3 |
| methylhexanes | 19.8 |
| dimethylcyclopentanes | 8.2 |
| n-heptane | 2.0 |
| methylcyclohexane | 0.7 |
| benzene | <0.01 |
| toluene | <0.01 |

A continuous isomerization of the light-naphtha was carried out in a flow reactor system in which a 300 milliliter capacity reactor was equipped with a motor driven magnetic stirrer. Tantalum pentafluoride (20 g, 0.072 mole) was loaded into the reactor under nitrogen, the reactor was closed, and hydrogen fluoride (60 ml, 59.3 g, 2.96 mole) was metered in. Hydrogen flow and stirring (1,200 rpm) were started, and the hydrocarbon feed consisting of approximately 21 wt.% normal pentane and 79 wt.% light-naphtha having the component analysis presented in Table I was added rapidly at first to fill the reactor, and then a constant hydrocarbon feed flow rate was maintained at about 31 cc/hr corresponding to weight hourly space velocity of about 2 weight units of hydrocarbon feed per hour per weight unit of $TaF_5$. A low flow of hydrogen in contact with the vigorously stirred hydrocarbon-catalyst mixture maintained a pressure of about 1,000 psi (70 kg/cm$^2$) and the temperature was maintained at 85° F. (29° C.). Incoming feed continuously displaced hydrocarbon and a small amount of catalyst into a settling vessel where the catalyst was separated and returned to the reactor while the hydrocarbon product passed overhead into a product receiver in which the product hold up time was one hour or less. Product was periodically drawn from the product receiver and analyzed by gas chromatography with results at approximately 36 hours on stream presented as Run 1 in Table III. Results at 36 hours are indicative of average catalyst residence time which could be expected in an operation of the isomerization process with continuous catalyst regeneration.

EXAMPLE 2

Using the isomerization procedure, reactor and reaction conditions including the space velocity described in Example 1 isomerization was carried out upon a feed consisting of approximately 20 wt.% normal pentane, 75 wt.% light-naphtha having the component analysis presented in Table I, and 5 wt.% of a refinery alkylate having component analysis as follows:

TABLE II

| Major Components in Alkylate | |
|---|---|
| Component | Wt. % |
| trimethylpentanes | 63.0 |
| dimethylhexanes | 11.4 |
| trimethylhexanes | 8.1 |
| multiply-branched C$_{10}$ | 11.1 |
| multiply-branched C$_{11}$+ | 6.4 |

Results at approximately 36 hours on stream are presented as Run 2 in Table III.

EXAMPLE 3

Using the isomerization procedure, reactor and reaction conditions including the space velocity described in Example 1 isomerization was carried out upon a feed consisting of approximately 20 wt.% normal pentane, 70 wt.% light-naphtha presented in Table I and 10 wt.% of the alkylate presented in Table II. Results are presented as Run 3 in Table III, demonstrating that doubling the content of the alkylate in the feed in comparison to Example 2 did not significantly improve the isomerization product ratios.

EXAMPLE 4

Using the isomerization procedure, reactor and reaction conditions including the space velocity described in Example 1 isomerization was carried out on a feed consisting of approximately 10 wt.% normal pentane, 35 wt.% of the light-naphtha presented in Table I, 5 wt.% of the alkylate presented in Table II, and 50 wt.% normal nonane. Results demonstrating the detrimental influence of normal nonane in depressing the isomerization product ratios are presented as Run 4 in Table III.

EXAMPLE 5

The isomerization feed in Example 1 was isomerized using the same procedure, reactor and reaction conditions including space velocity as described therein with the exception that the hydrogen pressure was reduced to 250 psig and the temperature was maintained at 87° F. as shown in Run 5 in Table III with the results shown therein, indicating the improved isomerization products under the lower hydrogen pressure.

EXAMPLE 6

Using the isomerization procedure, reactor and reaction conditions including the space velocity described in Example 1 isomerization was carried out on a feed consisting of approximately 84.5 wt.% 3-methylpentane, 10.7 wt.% methylcyclopentane, and 4.8 wt.% isooctane (2,2,4-trimethylpentane). Results after 36 hours are presented as Run 6 in Table IV.

EXAMPLE 7

Example 6 was repeated with the addition to the feed of 2.3 wt.% benzene, demonstrating the severely impaired isomerization product ratios caused by benzene poisoning of the $TaF_5$ catalyst.

EXAMPLES 8-10

Using the isomerization procedure, reactor, and reaction conditions including the space velocity described in Example 1 isomerization was carried out on feeds presented in Table IV under Runs 8-10. Significantly, the substitution of normal nonane in the feed for Run 9 in comparison to the isooctane component in the feed for Run 8 demonstrates that the straight-chain heavier paraffins interfere with and depress the desired isomerization product ratios, and particularly depress the production of isopentane and neohexane.

TABLE III

| | Run No. | | | | |
|---|---|---|---|---|---|
| | 1 | 2 | 3 | 4 | 5 |
| Conditions | | | | | |
| Pressure, psig | 1,000 | 1,000 | 1,000 | 1,000 | 250 |

TABLE III-continued

| | Run No. | | | | |
|---|---|---|---|---|---|
| | 1 | 2 | 3 | 4 | 5 |
| Temperature, °F. | 85 | 85 | 85 | 85 | 87 |
| Catalyst | | | | | |
| TaF$_5$ g. | 20 | 20 | 20 | 20 | 20 |
| HF ml. | 60 | 60 | 60 | 60 | 60 |
| WHSV (g. feed/g. TaF$_5$) | 1.04 | 1.04 | 1.04 | 1.04 | 1.04 |
| Feed components, wt. % (selected) | | | | | |
| n-pentane | 19.6 | 19.2 | 20.6 | 11.2 | 18.8 |
| methylpentanes | 7.7 | 7.9 | 7.6 | 3.9 | 7.4 |
| n-hexane | 24.0 | 22.8 | 21.2 | 10.9 | 21.9 |
| methylcyclopentane (MCP) | 8.1 | 7.5 | 6.9 | 3.5 | 7.2 |
| cyclohexane | 11.1 | 10.6 | 9.7 | 5.1 | 10.5 |
| C$_8$+ (alkylate) | — | 4.6 | 9.5 | 4.8 | 4.7 |
| dimethylcyclopentanes | 7.5 | 8.2 | 8.7 | 4.5 | 8.6 |
| methylcyclohexane (MCH) | 0.6 | 0.7 | 0.9 | 0.5 | 1.0 |
| n-nonane | | | | 49.0 | |
| Product components, wt. % (at 36 hours on stream) | | | | | |
| isobutane | 2.9 | 5.9 | 10.3 | 2.8 | 8.7 |
| neohexanes | 9.0 | 15.8 | 16.5 | 2.7 | 11.4 |
| C$_8$+ (alkylate) | — | 0.6 | 0.4 | 1.7 | 0.8 |
| isopentanes | 5.2 | 12.7 | 14.4 | 0.2 | 14.4 |
| dimethylpentanes | 6.5 | 6.6 | 6.4 | 5.5 | 4.6 |
| methylcyclopentane (MCP) | 3.2 | 2.3 | 2.0 | 4.5 | 3.0 |
| cyclohexane | 14.8 | 12.7 | 9.5 | 7.3 | 14.4 |
| dimethylcyclopentanes | 0.6 | 0.6 | 0.7 | 0.6 | 4.3 |
| methylcyclohexane (MCH) | 7.5 | 7.6 | 7.2 | 1.9 | 8.5 |
| n-nonane | | | | 21.7 | |
| Product ratios | | | | | |
| isopentane/pentanes | .27 | .66 | .68 | .01 | .74 |
| neohexane/hexanes | .28 | .50 | .52 | .12 | .37 |
| cyclohexane/cyclohexane and MCP | .82 | .86 | .83 | .62 | .83 |
| methylcyclohexanes/MCH + DMCP's | .93 | .93 | .92 | .76 | .96 |

TABLE IV

| Run No. | 6 | 7 | 8 | 9 | 10 |
|---|---|---|---|---|---|
| Conditions | | | | | |
| Pressure, psi | 1,000 | 1,000 | 1,000 | 1,000 | 1,000 |
| Temperature, °F. | 75 | 75 | 85 | 85 | 85 |
| Catalyst | | | | | |
| TaF$_5$ g. | 10 | 10 | 20 | 20 | 20 |
| HF ml. | 60 | 60 | 60 | 60 | 60 |
| WHSV | 2.06 | 2.16 | 1.10 | 1.05 | 1.04 |
| Feed components, wt. % | | | | | |
| 3-methylpentane | 84.5 | 82.8 | 75.0 | 68.3 | 2.5 |
| n-hexane | | | | | 72.9 |
| methylcyclopentane (MCP) | 10.7 | 10.0 | 20.0 | 22.4 | 19.2 |
| isooctane | 4.8 | 4.8 | 5.0 | — | 5.4 |
| benzene | | 2.3 | | | |
| n-nonane | | | | 9.4 | |
| Product components, wt. % (at 36 hours on stream) | | | | | |
| isobutane | 3.9 | 3.3 | 5.4 | 0.2 | 4.2 |
| neohexane | 8.3 | 1.6 | 18.9 | 3.4 | 27.2 |
| isooctane | 0.5 | 1.1 | 0.2 | — | 1.9 |
| methylcyclopentane (MCP) | 1.4 | 4.6 | 2.3 | 4.2 | 1.1 |
| cyclohexane (CH) | 9.1 | 4.9 | 17.5 | 16.9 | 12.0 |
| benzene | | 1.7 | | | |
| n-nonane | | | | | 1.3 |
| Product ratios | | | | | |
| cyclohexane / MCP + CH | .86 | .52 | .88 | .80 | .92 |
| neohexane / total hexanes | .097 | .019 | .26 | .049 | .36 |

We claim:

1. A process for upgrading a wide-boiling range naphtha hydrocarbon feedstock which process comprises:
   (a) separating a wide-boiling range naphtha feedstock into a low-boiling, first fraction having an end boiling point within the range of about 190° to about 220° F. (88° to 104° C.), and a high-boiling, second fraction having an initial boiling point within a range of about 190° to about 220° F. (88° to 104° C.);
   (b) isomerizing said first fraction in an isomerization zone by treating with hydrogen and a catalyst comprising tantalum pentafluoride and hydrogen halide;
   (c) separating a naphthene-rich fraction from the effluent of step (b); and
   (d) blending said naphthene-rich fraction with said second fraction from step (a).

2. The process of claim 1 wherein the product from step (d) is reformed to produce an aromatic-rich naphtha product.

3. The process of claim 2 wherein said first fraction from step (a) is substantially free of toluene.

4. The process of claim 2 wherein prior to step (b) said first fraction from step (a) is hydrotreated in order to saturate substantially all aromatic components.

5. The process of claim 2 wherein prior to step (b) said first fraction from step (a) is contacted with a selective adsorbent to remove aromatic components.

6. The process of claim 5 wherein said selective adsorbent comprises molecular sieve having the capacity to selectively remove benzene from said first fraction.

7. The process of claim 2 wherein said hydrogen halide comprises hydrogen fluoride.

8. The process of claim 2 wherein step (b) is carried out under hydrogen partial pressure in the range of about 25–1,000 psi (1.75–70 kg/cm$^2$) at temperature in the range of about 0°–150° F. (−17° to 66° C.) and a WHSV in the range of about 0.5–10 weight units of said first fraction per hour per weight unit of tantalum pentafluoride.

9. The process of claim 2 wherein step (b) is carried out under hydrogen partial pressure in the range of about 200–500 psi (14–35 kg/cm$^2$), at temperature in the range of about 70°–90° F. (21°–32° C.) and a WHSV in the range of about 0.5–2.5 weight units of said first fraction per hour per weight unit of tantalum pentafluoride.

* * * * *